Feb. 1, 1972 W. S. HAYNES, JR., ET AL 3,639,372

METHOD FOR THE POLYMERIZATION OF ALKENYL AROMATIC MONOMERS

Filed June 24, 1968

INVENTORS.
Winfield Scott Haynes, Jr.
Carroll T. Miller
BY [signature]
AGENT

United States Patent Office 3,639,372
Patented Feb. 1, 1972

3,639,372

METHOD FOR THE POLYMERIZATION OF ALKENYL AROMATIC MONOMERS

Winfield Scott Haynes, Jr., Freeland, and Carroll T. Miller, Midland, Mich., assignors to The Dow Chemical Company, Midland, Mich.

Filed June 24, 1968, Ser. No. 739,416
Int. Cl. C08f 1/06, 1/98, 7/04
U.S. Cl. 260—93.5 S 6 Claims

ABSTRACT OF THE DISCLOSURE

Styrene-type monomers are polymerized in a plurality of heat exchange vessels connected in series. In a polymerization system for styrene-type monomers where the monomer is polymerized in a polymerization train consisting of at least three polymerization vessels connected in series, increased polymerization capacity is obtained by recirculating the contents of a second heat exchange vessel.

Figure 1:
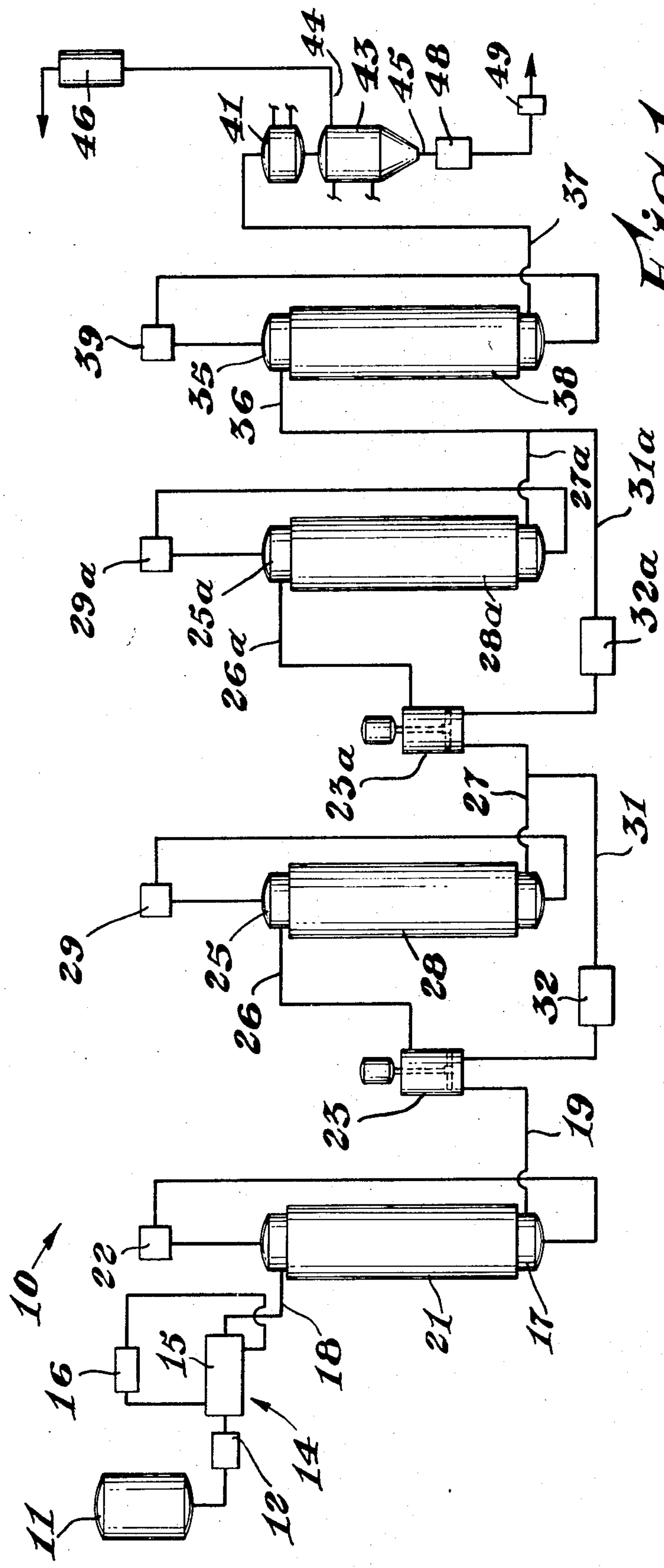

This invention relates to polymerization and apparatus therefor, and more particularly relates to a method and apparatus particularly suited for the polymerization of alkenyl aromatic monomers. By the term "alkenyl aromatic monomer" is meant an alkenyl aromatic compound having the general formula $$Ar-\overset{R}{\overset{|}{C}}=CH_2$$

wherein Ar represents an aromatic hydrocarbon radical, or an aromatic halohydrocarbon radical of the benzene series, and R is hydrogen or the methyl radical. Examples of such alkenyl aromatic monomers are styrene, α-methylstyrene, o - methylstyrene, m - methylstyrene, p-methylstyrene, ar-ethylstyrene, ar-vinylxylene, ar-chlorostyrene or ar-bromostyrene and the like.

Many methods are employed to polymerize alkenyl aromatic or styrene-type monomers wherein a desired monomer, mixture of monomers or dispersion of rubber in monomer is passed to one or more polymerization vessels and polymerized to a suitable conversion; excess monomer and low boiling materials such as dimers, trimers and diluents are removed. The monomer is recirculated and the devolatilized polymer subsequently shaped, cooled and oftentimes cut into pellets for molding and extrusion. One particularly desirable approach to such polymerization is to employ three or more heat exchange vessels such as shell and tube heat exchangers, pass the monomer through a first or prepolymerizing vessel maintained at a desired temperature, through a second heat exchange vessel maintained at a somewhat different temperature, and through a third heat exchange vessel maintained at still another temperature. Three or more vessels are employed, depending upon the product desired and equipment available. Beneficially, such heat exchange vessels are of the shell and tube variety and are without internal agitation. The monomers are passed in the space within such a vessel within the shell and around the tubes while a suitable heat exchange fluid such as a gas vapor, liquid or mixture thereof is circulated within the tubes and beneficially in a heat exchange jacket about the shell of the heat exchange vessel. As shell and tube heat exchange vessels are not agitated, the polymerization must be operated in such a manner that undesired buildup within the vessel does not occur, thereby altering the effective volume as well as the heat transfer characteristics. The alkenyl aromatic resins are generally soluble in their monomers and as polymerization progresses, the viscosity of the monomer-polymer mixture increases rapidly and at times gelation may occur and result in partial plugging of the heat exchange vessel. Therefore, for practical purposes of continuous operation, it has been found usually necessary to employ a diluent in order to maintain the polymerizing mixture sufficiently fluid to operate satisfactorily. For example, in the polymerization of styrene, it is generally found necessary to employ about 12 weight percent of ethyl benzene to maintain a sufficiently fluid reaction mixture for continuous operation. A relatively high level of diluent causes several undesirable effects; e.g., ethyl benzene used as the diluent acts as a chain transfer agent with the result being lower molecular weight and lower solution viscosity. To compensate for these effects, the through-put rate of the polymerization system usually must be reduced and temperatures lowered to obtain the high molecular weight materials desired. The higher the level of diluent, the more corrective measures must be applied to the polymerization system. Such a diluent must be removed from the reaction mixture on recovery of the polymer.

It would be desirable if there were available an improved method and apparatus for the conversion of alkenyl aromatic monomers to polymers employing non-agitated heat exchange vessels.

It would be further desirable if there were available an improved method and apparatus for the preparation of such polymers employing non-agitated vessels which would provide a higher production rate of polymer.

It would also be desirable if there were available a method and apparatus for the polymerization of alkenyl aromatic monomers having improved production rates and requiring a substantially reduced quantity of diluent.

These benefits and other advantages in accordance with present invention are achieved in a method for the polymerization of alkenyl aromatic monomers to provide useful polymeric products, the steps of the method comprising providing a stream containing at least a major portion of an alkenyl aromatic polymerizable material, passing the stream through at least a first unstirred heat exchange reaction zone and polymerizing a portion of the polymerizable material therein, passing the stream from the first zone to an intermediate unstirred heat exchange reaction zone causing an additional portion of the stream to polymerize therein, passing the stream to a third unstirred heat exchange reaction zone and causing further polymerization of the stream to provide a stream containing polymerized monomeric material, the improvement which comprises dividing the stream as it leaves the intermediate zone into a recirculated stream portion and an unrecirculated stream portion, the volume of the recirculated stream portion being at least equal to the volume of the unrecirculated stream portion, admixing the recirculated stream portion with the stream at a location generally intermediate the first zone and the intermediate zone.

Also contemplated within the scope of the present invention is an apparatus for the continuous polymerization of monomers to polymeric products, the apparatus comprising an alkenyl aromatic monomer supply means, first, first intermediate and terminal unstirred heat exchange reaction vessels, each of the vessels having an inlet and an outlet, the inlet of the first vessel being in operative combination with the monomer supply means, the inlet of the intermediate vessel being in operative communication with the outlet of the first reaction vessel, the inlet of the terminal vessel being in operative communication with the outlet of the intermediate vessel, mixing means disposed between the inlet of the intermediate vessel and the outlet of the first vessel, the mixer adapted to agitate material passing from the outlet of the first vessel to the inlet of the first intermediate vessel, a fluid transfer means in operative communication with the inlet of the terminal vessel and the mixing means adjacent the outlet of the first vessel, the fluid transfer means adapted to forward fluid from a location generally adjacent the inlet of the terminal vessel to the mixing means.

The present invention is particularly adapted for polymerization of alkenyl aromatic monomers and is particularly suited for the preparation of polystyrene. Polymerization may be carried out either thermally; that is, in the absence of catalysts, or in the presence of free radical initiators such as tertiary butyl hydroperoxide, tertiary butyl carbonate, lauryl peroxide and the like. Generally, polymerization employing the present invention is readily accomplished employing well known monomer mixtures and polymerization temperatures. Conventional additives such as lubricants, stabilizers and the like conventionally employed in a polymerization process are eminently suited for use in the method and apparatus of the present invention. The individual zones employed in the present invention may be made up of one or more unstirred reaction vessels of the heat exchange variety. Generally, in the preparation of alkenyl aromatic resins from alkenyl aromatic monomers, it is particularly desirable that recirculation take place in a polymerization process in a polymerization zone where from about 25 to about 55 weight percent of the monomer has been converted to polymer, and advantageously in the region from about 30 to 55 percent conversion has occurred. If polymerization is normally accomplished by conversion of about 25 percent of the monomer to polymer in a single zone, the first zone of the present invention should be sized accordingly. If 60 percent of the monomer is converted to polymer during the next polymerization stage, the intermediate zone should be of suitable volume to provide the desired inventory time at the predetermined temperature. The terminal or finishing zone is then heated and sized to give the desired inventory time to provide a product of the desired characteristics. Recirculation of a portion of the effluent from an intermediate zone should be at least about 50 percent of the total material leaving the intermediate zone; that is, if a stream is leaving the intermediate zone at a rate of 100 pounds per hour, at least 50 percent of this material should be recirculated and admixed with the feed to the intermediate zone. In order to achieve maximum polymerization rates employing the present invention, it is oftentimes desirable to increase the amount of recirculation to 80 percent and beneficially to about 90 percent or greater. Beneficially, recirculation may be applied to the first stage or vessel. When such recirculation is employed, generally the size of the vessel may be reduced.

FIG. 1 schematically depicts an apparatus in accordance with the present invention.

Figure 2:
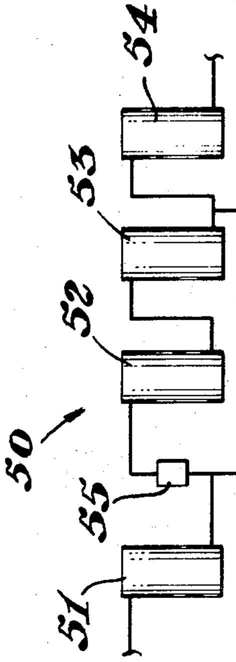

FIG. 2 depicts an alternate embodiment of the invention.

In FIG. 1 there is schematically illustrated an apparatus in accordance with the present invention generally designated by the reference numeral 10. The apparatus 10 comprises in cooperative combination a supply means 11 adapted to provide a polymerizable alkenyl aromatic material. The supply means 11 is in operative combination with an inlet of a pump or forwarding means 12 adapted to forward material from the supply 11 to a heating means 14 such as a heat exchanger. The heating means 14 comprises a heat exchanger 15 in operative combination with a temperature control means and heat exchange fluid supply 16. The heating means 14 is in operative communication with a first unstirred heat exchange vessel 17. The vessel 17 has an inlet 18 and an outlet 19. The heat exchange vessel 17 has disposed thereabout an external temperature control jacket 21. The vessel 17 and jacket 21 are in operative combination with temperature control means and a heat exchange fluid supply 22. Beneficially, the vessel 17 is a shell and tube heat exchanger wherein the heat exchange fluid is passed through the jacket, through the tubes while the polymerizable material is passed through the space between the shell and tubes. A first mixing means 23 is in operative communication with the outlet 19 of the vessel 17. The mixing means 23 is also in communication with a first intermediate unstirred polymerization vessel 25 having an inlet 26 and an outlet 27. Liquid passing from the outlet 19 to the inlet 26 passes through the mixing means and is mixed thereby. The polymerization vessel 25 beneficially is also of shell and and tube construction similar to the vessel 17 wherein the polymerizable stream is passed in the space between the shell and tubes. The vessel 25 has a jacket 28. The jacket and tubes are in operative combination with a temperature control means and heat exchange fluid supply 29. A fluid or liquid transfer means 31 is in operative communication with the discharge 27 of the intermediate heat exchange vessel 25 and in communication with a location generally adjacent the outlet 19 of the vessel 17 to permit passage of liquid through the liquid transfer means 31 so that effluent from the liquid transfer means 31 flowing from the outlet 27 to a location adjacent the outlet 19 passes through the mixing means 23 to the inlet 26. A pump or forwarding means 32 is disposed in the liquid transfer means or conduit 31. A second unagitated heat exchange vessel 25a is disposed generally adjacent the heat exchange vessel 25. The heat exchange vessel 25a has an inlet 26a and an outlet 27a, a jacket 28a in operative association with a temperature control means and heat exchange fluid supply 29a. A liquid transfer means 31a is in operative communication between the outlets 27 and 27a. The liquid transfer means 31a has disposed therein a pump 32a adapted to forward liquid from the outlet 27a to the outlet 27. A mixing means 23a is in operative communication with the outlet 27 and the inlet 26a and provides communication therebetween. Thus, liquid passes from the outlet 27a through the liquid transfer means 31 into the mixer 23a and into the inlet 26a. A terminal reaction vessel 35 has an inlet 36 and an outlet 37. The vessel 35a is an unagitated heat exchange vessel beneficially of the shell and tube variety such as the vessels 25 and 25a. A temperature control means and heat exchange fluid supply 39 is in operative communication with an external jacket 38 and the tubes of the vessel 35. The inlet 36 is in operative communication with the outlet 27a of the vessel 25a. A fluid heating means 41 is in operative communication with the outlet 37 and is adapted to receive effluent therefrom and raise the temperature of the effluent to a desired range. The heating means 41 discharges to a devolatilizing apparatus 43 having a vapor discharge 44 and a polymer discharge 45. The vapor discharge 44 and the devolatilizer 43 are in operative communication with a monomer purification system 46 adapted to separate the polymerizable materials from the non-polymerizable materials. The polymer discharge 45 is in operative communication with a polymer forwarding means 48 which forwards heat plastified polymer to a shaping and processing means 49 such as an extrusion die and strand chopper.

In operation of the apparatus of FIG. 1, a polymerizable monomer with a suitable quantity of diluent is passed into and through the first heat exchange vessel. The vessels are maintained hydraulically full with the desired polymerizable mixture and each vessel adjusted to provide a desired polymerizing temperature. The polymerizable mixture is continuously provided from the supply means 11 and mixing means 23 and 23a are agitated. The liquid transport means 31 and 31a are adjusted to provide the desired degree of recirculation. When equilibrium is attained, the polymer is devolatilized in the devolatilizing means 43 and subsequently processed by the processing means 49.

An alternate embodiment of the invention is schematically depicted in FIG. 2 and is generally designated by the reference numeral 50. The apparatus 50 has a first unstirred vessel 51, first and second intermediate vessels 52 and 53 and a terminal vessel 54. Inlets and outlets of the vessels 51–54 are connected generally in the manner of the vessels 17, 25, 25a and 35 of FIG. 1. A mixing means 55 is disposed between the first vessel 51 and the first intermediate vessel 52. A fluid transfer means 56 is connected between the outlet of the second intermediate vessel 53 and the outlet of the first intermediate vessel 52. The fluid transfer means 56 is adapted to forward a portion of the effluent from an intermediate polymerization zone formed by the vessels 52 and 53 through the mixing means 55 and into the vessel 52.

The invention is further illustrated by the following examples.

EXAMPLE 1

A polymerization train is employed generally as depicted in FIG. 1 with the exception that only one intermediate vessel is employed. The polymerization vessels are of equal volume and the three vessels combined have a volume between the tubes and the shells sufficient to hold 1560 pounds of styrene monomer. The polymerization mixture is transferred from the outlet of the intermediate vessel to the mixing means at a rate of about 1200 pounds per hour. The reaction mixture in the first vessel is maintained at a temperature of 121° C.; the second vessel at 137° C. and the third vessel at 141° C. at a location midway between the inlet and outlet of the particular vessel. A mixture of 93 weight percent styrene and 7 weight percent ethyl benzene is continuously fed to the first reaction vessel at a temperature of 116° C. and a rate of 156 pounds per hour. Polystyrene after devolatilization is obtained at a rate of 119 pounds per hour. Conversion of the effluent from the first, second and third vessels is 26 percent, 51 percent and 76 percent, respectively. The polystyrene obtained has a solution viscosity (viscosity of 10 weight percent solution in toluene at 25° C.) of 32.5 centipoises.

For purposes of comparison, polystyrene is prepared without recirculation employing as a feed stock a mixture of 88 weight percent styrene and 12 weight percent ethyl benzene at a rate of 131 pounds per hour. All of the effluent from the intermediate vessel is passed to the third vessel wherein the first vessel has a temperature of 126° C.; the intermediate vessel has a temperature of 127° C. and the third vessel has a temperature of 137° C. Conversion at the outlet of the first, intermediate and third vessels is 32 percent 47 percent and 65 percent, respectively. Eighty-five pounds per hour of devolatilized polystyrene is obtained having a solution viscosity of 29.7 centipoises (10 weight percent in toluene at 25° C.)

EXAMPLE 2

A feed of 96 weight percent styrene and 4 weight percent ethyl benzene is fed to the apparatus employed in Example 1 at a rate of 200 pounds per hour with recirculation in the second vessel at a rate of 1200 pounds per hour. The first vessel is maintained at a temperature of 120° C.; the second vessel at 139° C. and the third vessel at 145° C. Conversions obtained from the effluent of the first, second and third vessels are 25 percent, 58 percent and 77 percent, respectively. One hundred fifty-four pounds of devolatilized polystyrene is obtained having a solution viscosity of 33.9 centipoises (10 weight percent in toluene at 25° C.)

Without recirculation, a feed stream of 88 weight percent styrene and 12 weight percent ethyl benzene is passed through the polymerization apparatus at the rate of 200 pounds per hour. The temperature of first, second and third vessels is 129° C., 131° C. and 156° C., respectively. Conversions in the first, second and third vessels is 24 percent, 43 percent and 74 percent, respectively. One hundred forty-eight pounds per hour of devolatilized polystyrene is obtained having a solution viscosity of 19.6 centipoises (10 weight percent solution in toluene at 25° C.)

A fed stream of 90.5 weight percent styrene and 9.5 weight percent ethyl benzene is passed to the polymerizer at an initial rate of 240 pounds per hour. The first,, second and third vessels are maintained at temperatures of 132° C., 141° C. and 153° C., respectively. Stable operating conditions are not obtained. In order to obtain a conversion of about 74 percent, it is necessary to reduce the feed rate over the course of the run to a final volume of 163 pounds per hour. Initially, conversion at the outlets of the first second and third vessels is 32 percent, 52 percent and 74 percent, respectively. At the end of the run, conversions are 32 percent, 45 percent and 73 percent, respectively. One hundred seventy-five pounds of devolatilized polystyrene are initially obtained. Solution viscosity of the initial product is 20.5 centipoises (10 weght percent solution in toluene at 25° C.) At the end of the run the solution viscosity is 18.5 centipoises. At the end of the run, each vessel is drained and 161 pounds of gelled polystyrene is found in the intermediate vessel, or 35 percent of the initial useful volume of the vessel is filled with polystyrene.

EXAMPLE 3

A polymerization apparatus similar to that of Example 1 is employed wherein the first, second and third vessels have volume ratios of 100:94:57, respectively, and the total capacity of the system for styrene monomer is 1320 pounds. The liquid transfer means is adapted to move liquid from the outlet of the intermediate vessel at a rate of 1200 pounds per hour. A feed stream of 96 weight percent styrene and 4 weight percent ethyl benzene is fed to the first vessel at a rate of 223 pounds per hour. The first vessel is maintained at a temperature of 123° C.; the second vessel at 149° C. and the third vessel at 178° C. The conversion of styrene to polymer at the outlets of the first, second and third vessels is 20 percent, 59 percent and 83 percent, respectively. One hundred eighty-four pounds of devolatilized polystyrene are obtained having a solution viscosity of 23 centipoises (10 weight percent solution in toluene at 25° C.)

EXAMPLE 4

Employing the apparatus of Example 3, a feed stream of 96 weight percent styrene and 4 weight percent ethyl benzene at a rate of 268 pounds per hour, wherein the first vessel is maintained at 127° C.; the second vessel at 158° C. and the third vessel at 178° C., 225 pounds of devolatilized polystyrene are obtained having a solution viscosity of 18 centipoises. The conversion at the outlets of the first, second and third vessels is 20 percent, 63 percent and 83 percent, respectively.

In the foregoing illustrations, the limitation on the rate of polymer production employing recirculation is primarily due to inadequate devolatilization facilities and maximum production of the polymerization unit is not achieved. When employing recirculation in accordance with the present invention, no buildup of gelled polymer is observed in the reaction vessels.

In a manner similar to the foregoing illustrations, other alkenyl aromatic monomers are readily polymerized to alkenyl aromatic resins in unstirred polymerization vessels employing recirculation in the region from about 25 to 55 percent conversion.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a method for the polymerization of alkenyl aromatic monomers to provide useful polymeric products, the steps of the method comprising:

providing a stream of a polymerizable mixture containing at least a major portion of an alkenyl aromatic polymerizable material, passing the stream through at least a first unstirred heat exchange reaction zone, polymerizing a portion of the polymerizable material therein, passing the stream from the first zone to an intermediate unstirred heat exchange reaction zone causing an additional portion of the stream to polymerize therein, passing the stream to a third unstirred heat exchange reaction zone and causing further polymerization of the stream to provide a stream containing polymerized monomeric material, the improvement which comprises dividing the stream as it leaves the intermediate zone into a recirculated stream portion and an unrecirculated stream portion, the volume of the recirculated stream portion being at least equal to the volume of the unrecirculated stream portion, admixing the recirculated stream portion at a location generally intermediate the first zone and the intermediate zone and passing the unrecirculated stream portion to the third unstirred heat exchange zone.

2. The method of claim 1 wherein the alkenyl aromatic polymerizable material is styrene.

3. The method of claim 1 wherein at least 25 percent of the polymerizable material is converted to polymer in the first zone and up to 55 percent is converted to polymer in the intermediate zone.

4. The method of claim 3 wherein the stream contains up to about 7 weight percent of a non-polymerizable diluent.

5. The method of claim 1 including removing the stream from the third zone, separating volatile materials therefrom and cooling the stream below its thermoplastic temperature.

6. In a method for the polymerization of styrene to polystyrene, the steps of the method comprising:

providing a stream, the stream comprising monomeric styrene, passing the stream through a first unstirred heat exchange reaction zone and polymerizing from about 25 to 30 percent of the styrene to polystyrene, thereby forming a solution of polystyrene in styrene monomer, passing the stream to an intermediate unstirred heat exchange reaction zone, polymerizing styrene therein until from 50 to 55 percent of the styrene is polymerized polystyrene, passing the stream from the intermediate reaction zone to a third unstirred heat exchange reaction zone, and subsequently polymerizing the remaining styrene monomer to convert at least a major portion of remaining styrene monomer to polystyrene, subsequently separating polystyrene from the stream by cooling the polystyrene below its thermoplastic temperature, the improvement which comprises recirculating at least 50 percent of the stream from the intermediate zone to a location between the first zone and the intermediate zone wherein the stream leaving the first zone contains from about 25 to 30 percent polystyrene and the stream leaving the intermediate zone contains about 50 to 55 percent polystyrene.

References Cited

UNITED STATES PATENTS

| | | | |
|---|---|---|---|
| 2,530,409 | 11/1950 | Stober et al. | 260—93.5 |
| 3,513,145 | 5/1970 | Crawford | 260—93.5 |
| 2,936,303 | 5/1960 | Goins | 260—94.9 |
| 3,074,922 | 1/1963 | Dye et al. | 260—94.2 M |

JAMES A. SEIDLECK, Primary Examiner

U.S. Cl. X.R.

23—260; 260—95 C